UNITED STATES PATENT OFFICE.

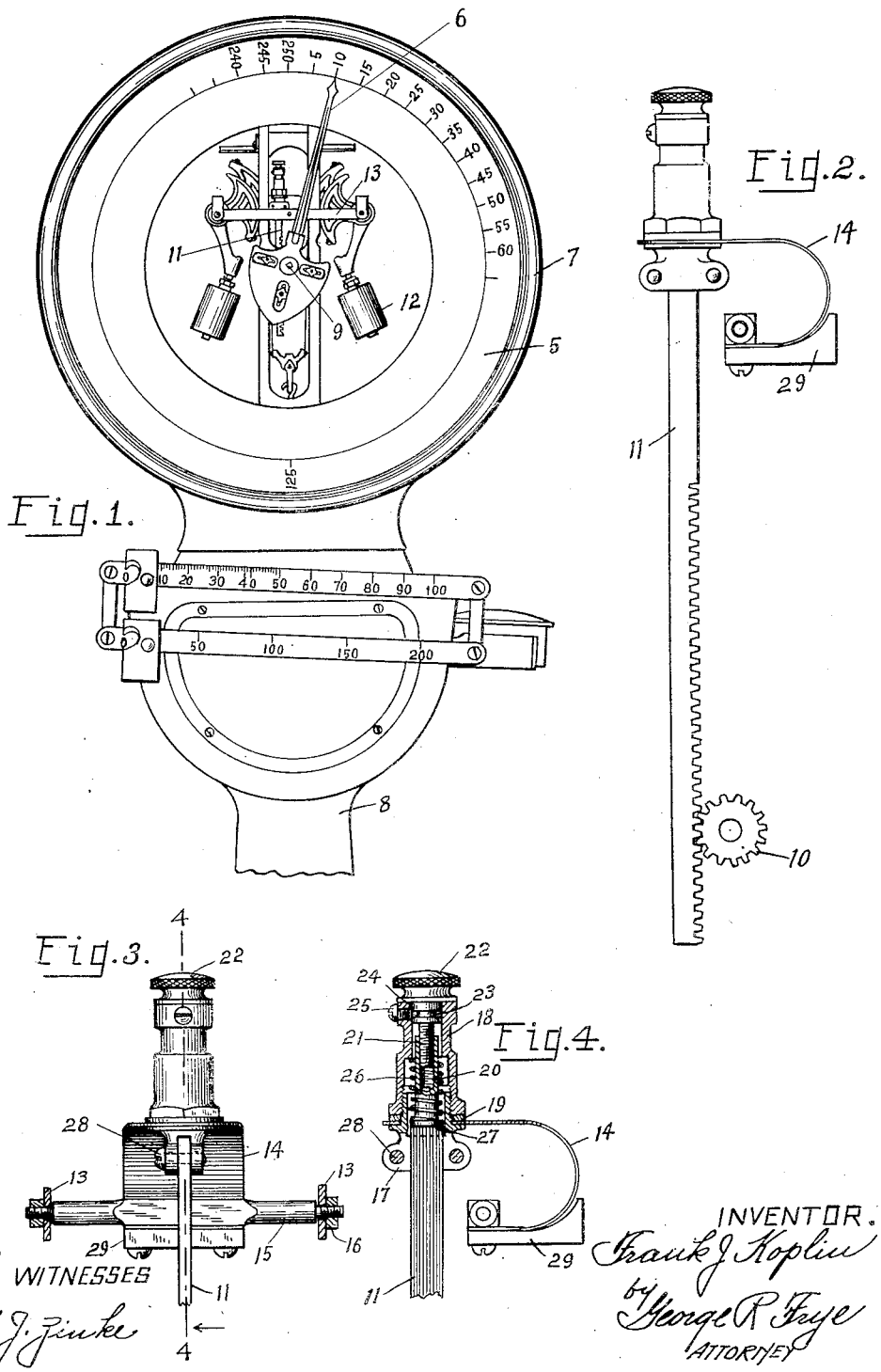

FRANK J. KOPLIN, OF TOLEDO, OHIO, ASSIGNOR TO TOLEDO SCALE COMPANY, OF TOLEDO, OHIO, A CORPORATION OF NEW JERSEY.

WEIGHING-SCALE.

1,364,385.  Specification of Letters Patent.  Patented Jan. 4, 1921.

Application filed February 12, 1916. Serial No. 77,836.

*To all whom it may concern:*

Be it known that I, FRANK J. KOPLIN, a citizen of the United States, residing at Toledo, in the county of Lucas and State of Ohio, have invented certain new and useful Improvements in Weighing-Scales, of which the following is a specification.

This invention relates to weighing scales, and more particularly to scales giving the weight indications by means of a graduated chart or dial in conjunction with an indicator hand or pointer angularly movable over the graduated face of the dial a distance proportional to the displacement of the weighing mechanism. One of the best known methods of imparting the desired movement to the indicator hand or pointer is to secure the hub of the indicator hand upon a rotatable shaft which also carries a pinion fixed thereon in position to mesh with a reciprocating rack suitably connected with and actuated by the weighing mechanism of the scale. It has been found difficult, however, to maintain the reciprocating rack in fixed position with its teeth firmly meshing with the teeth of the pinion for various reasons, since the rack may become twisted axially so as to bring the teeth out of alinement, the rack may be shifted from its normal vertical position, etc. It is toward the improvement of the means of mounting the rack with relation to the pinion that my present invention is directed. The present construction provides an efficient means for preventing any axial twisting of the rack and will clamp the rack securely in any adjusted position, while permitting ready adjustment of the rack in a vertical plane.

Other objects and advantages will readily appear from the following description, in which reference is had to the accompanying drawings illustrating a preferred embodiment of my invention, and in which similar reference characters designate similar parts throughout the several views.

In the drawings:—

Figure 1 is a front view of the upper portion of a weighing scale embodying my improved device.

Fig. 2 is an enlarged front elevation of the rack and associated parts.

Fig. 3 is a side elevation of the upper portion of the rack, and

Fig. 4 is a central vertical section taken on the line 4—4 of Fig. 3.

Referring to the drawings, the numeral 5 designates the dial of the scale, upon which are marked the weight indications or graduations, and 6 indicates the indicator hand or pointer which coöperates with the weight indications upon the dial 5 so as to indicate the weight of any commodity weighed on the scale. The dial 5 is suitably supported in position within the housing 7 of the scale, which housing is preferably mounted upon a column 8, the lower end of which column rests upon the platform (not shown) of the scale. The indicator hand 6 is preferably mounted adjacent the end of the indicator shaft 9 which is mounted centrally of the dial and carries a pinion 10 adapted to mesh with the vertically-disposed reciprocating rack 11 which is suitably connected with the weighing mechanism of the scale so as to rotate the pinion a distance proportional to the displacement of the load-offsetting mechanism.

It is to be understood that the weighing mechanism of the scale may be of any approved type, and that the means of actuating the rack from the weighing mechanism may be of any desired form, various weighing mechanisms well known in the scale art being fully capable of performing the required functions. The embodiment herein illustrated is one that has been found to successfully demonstrate the capabilities of this invention, and shows a pendulum scale of a well known type adapted to vertically reciprocate the rack upon the displacement of the pendulum mechanism, the rack meshing with the pinion carried upon the indicator shaft, and suitable connecting means being interposed between the platform supporting levers and the pendulum load-offsetting mechanism to swing the pendulums 12 outwardly upon the placing of a load upon the scale platform. Inasmuch as the present invention is not dependent upon any particular form of scale mechanism, no attempt is made in this application to show a complete scale mechanism nor to delineate the action of the scale in its load-offsetting or weighing operations; only so much of the scale mechanism being shown as is necessary to clearly portray the position and operation of my improved rack and coöperating mechanism forming the claimed invention herein disclosed.

In the embodiment herein illustrated, the oppositely-disposed pendulums 12 are connected by crossbars 13, which crossbars are moved vertically upward as the pendulums are displaced outwardly, and are again lowered as the pendulums return to their normal positions. The rack 11 may be therefore conveniently attached to these crossbars 13, and is preferably mounted as follows: A resilient connector 14 is secured adjacent its upper extremity to the rack and at its lower end is secured to a shaft 15 which is provided with trunnions 16 loosely mounted within apertures disposed substantially centrally of the length of the crossbars 13. The upper end of the resilient connector 14 is apertured and fits over the threaded shank of a shouldered clamp member 17 and is firmly secured in position between the shoulder and the lower extremity of an internally threaded sleeve member 18, as shown in Fig. 4, a washer 19 being suitably interposed between the resilient connector and said sleeve. The body portion of the rack 11 is preferably oblong in cross section and is provided with a tubular internally threaded shank 20 at its upper extremity, the shoulder 27 being provided adjacent the lower end of said shank substantially as shown. The body portion of the rack is arranged between the clamping jaws of the member 17 with the tubular shank extending upwardly within the sleeve 18 and threading upon the downwardly extending bolt 21 carried by the adjusting screw 22. The set screw 22 is preferably provided with a circular groove 23 adapted to receive the tenon 24 of the lock screw 25, and by rotating the set screw 22 in one direction or the other, as desired, the rack 11 may be moved upwardly or downwardly, the lock screw 25 serving to prevent longitudinal motion of the set screw 22, while the threaded bolt portion 21 coöperating with the threaded shank 20 of the rack serves to move the rack longitudinally as desired. A light coil spring 26 may be introduced between the shoulder 27 upon the rack and a shouldered portion of the sleeve 18 so as to press the rack normally downward and maintain it in its extended position so as to take up any lost motion. The jaws of the clamping member 17 are suitably arranged to receive screws or similar clamping elements, and any desired means may be employed to draw said clamping jaws together to hold the body portion of the clamp in any adjusted position. In the embodiment herein illustrated suitable screws 28 are threaded into apertures in the clamping jaws, and whenever an adjustment of the rack must be made the screws 28 are first loosened and then the set screw 22 rotated to bring the rack to the desired position, whereupon the screws 28 are again tightened to lock the rack in its new position.

The rack and associated mechanism being connected with the crossbars 13 of the weighing mechanism upon trunnions freely mounted within the apertures in the side bars, it has been found desirable to provide a counterbalance for a portion of the weight of the rack and associated mechanism. Accordingly, a counterbalance weight 29 is secured on the opposite side of the trunnions from the rack adjusting mechanism substantially as shown in Fig. 2 and is arranged to offset the greater portion of the weight of the rack and associated mechanism, the rack 11 being overbalanced just sufficiently to allow it to normally maintain a firm hold on the teeth of the pinion by gravity.

Having described my invention, I claim:

1. In a scale, load-counterbalancing means, weight-indicating means including a dial and a pointer, a pinion coöperating with the pointer, a rack meshing with the pinion, and means for longitudinally adjusting the position of the rack, comprising an anchor member connected with the load-counterbalancing means, a rotatable member mounted therein and carrying a threaded post, and a threaded socket member on said rack coöperating with the post.

2. In a scale, load-counterbalancing means, weight-indicating means including a dial and a pointer, a pinion coöperating with the pointer, a rack meshing with the pinion, and means for longitudinally adjusting the position of the rack, comprising an anchor member, a resilient connector supporting the anchor member and secured to the load-counterbalancing means, a screw-threaded member rotatively mounted in the anchor member, and a coöperating screw-threaded member on said rack.

3. In a scale, load-counterbalancing means, weight-indicating means including a dial and a pointer, a pinion coöperating with the pointer, a rack meshing with the pinion, and means for longitudinally adjusting the position of the rack, comprising an anchor member connected with the load-counterbalancing means, a screw-threaded member rotatively mounted therein, a coöperating screw-threaded member on said rack, and clamping means carried by said anchor member for holding said rack in any adjusted position.

4. In a scale, load-counterbalancing means, weight-indicating means including a dial and a pointer, a pinion coöperating with the pointer, and a rack meshing with the pinion, said rack being formed with an oblong body portion and a threaded shank portion, and adjustable means for connecting the rack with the load-counterbalancing means, comprising an anchor member secured to the load-counterbalancing means and carrying a threaded member coöperating with the threaded shank of the rack, said anchor member being also provided with clamping and guide jaws arranged to fit against the body portion of the rock.

5. In a scale, load-counterbalancing means, a dial, a pointer, a pinion coöperating with the pointer, a rack meshing with the pinion having an oblong body portion and a threaded shank portion separated from the body portion by a collar, and means for adjustably connecting the rack with the load-counterbalancing means, including an anchor member formed with guide walls coacting with the oblong body portion of the rack, a rotatable threaded member coöperating with the shank portion of the rack, and a resilient member impinging on said collar to take up lost motion between said threaded members.

FRANK J. KOPLIN.

Witnesses:
KARL E. HAYES,
CARL J. ZINKE.